United States Patent [19]
Jardin et al.

[11] Patent Number: 6,073,994
[45] Date of Patent: Jun. 13, 2000

[54] MOTOR VEHICLE SLIDING ROOF

[75] Inventors: Hans Jardin, Inning-Bachern; Oskar Braunsberger, Mindelheim, both of Germany

[73] Assignee: Webasto Systemkomponenten GmbH, Stockdorf, Germany

[21] Appl. No.: 09/015,292

[22] Filed: Jan. 29, 1998

[30] Foreign Application Priority Data

Feb. 1, 1997 [DE] Germany ............... 197 03 818

[51] Int. Cl.⁷ ..................................... B60J 7/05
[52] U.S. Cl. .............. 296/213; 296/216.02; 296/218
[58] Field of Search .................. 296/213, 216.02, 296/218

[56] References Cited

U.S. PATENT DOCUMENTS

| | | |
|---|---|---|
| 4,566,730 | 1/1986 | Knabe et al. . |
| 4,883,311 | 11/1989 | Kohlpainter et al. .............. 296/213 |
| 4,971,386 | 11/1990 | Bohm et al. ....................... 296/213 |
| 5,718,472 | 2/1998 | Otake et al. ....................... 296/221 |

FOREIGN PATENT DOCUMENTS

| | | |
|---|---|---|
| 2 645 803 | 10/1990 | France . |
| 34 44 606 | 3/1989 | Germany . |
| 61-27724 | 2/1986 | Japan . |

*Primary Examiner*—D. Glenn Dayoan
*Assistant Examiner*—Lori L. Coletta
*Attorney, Agent, or Firm*—Nixon Peabody LLP; David S. Safran

[57] ABSTRACT

The invention relates to a sliding and lifting roof for motor vehicles with a cover (1) which selectively closes or at least partially exposes a roof opening (11) formed in a fixed part (8) of the vehicle roof, and with a movable gutter (4) which in the closed position of the cover engages under the rear edges of the cover (1) and a part of the fixed roof to the rear of the roof opening (11). The gutter (4) is joined by at least one elastic connection arm (5) to parts of the cover or a cover reinforcing part (3) at a distance from the rear edge (2) of the cover. In the closed position of the cover, the gutter is pressed against the underside of the cover (1) and the fixed roof part (8) by a prestressing of the connection arms (5). To ensure simple installation and provide reliable operation of the gutter (4), the connection arms (5) are made of an elastically flexible construction and are held by form-fit on the cover parts or cover reinforcing part (3).

5 Claims, 2 Drawing Sheets

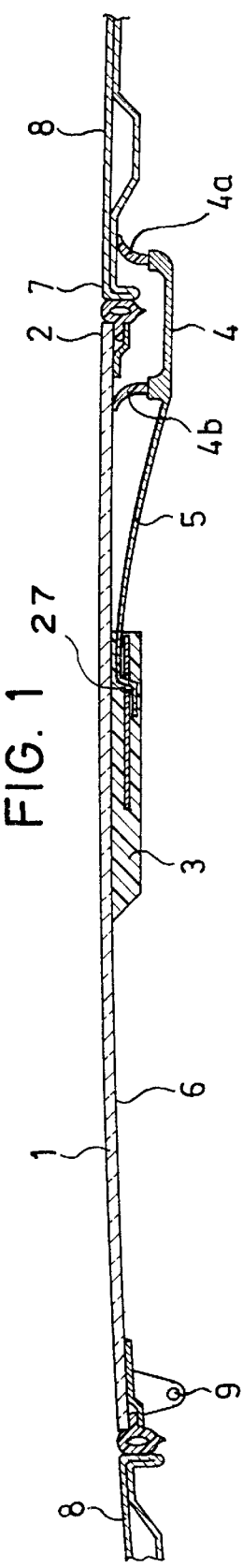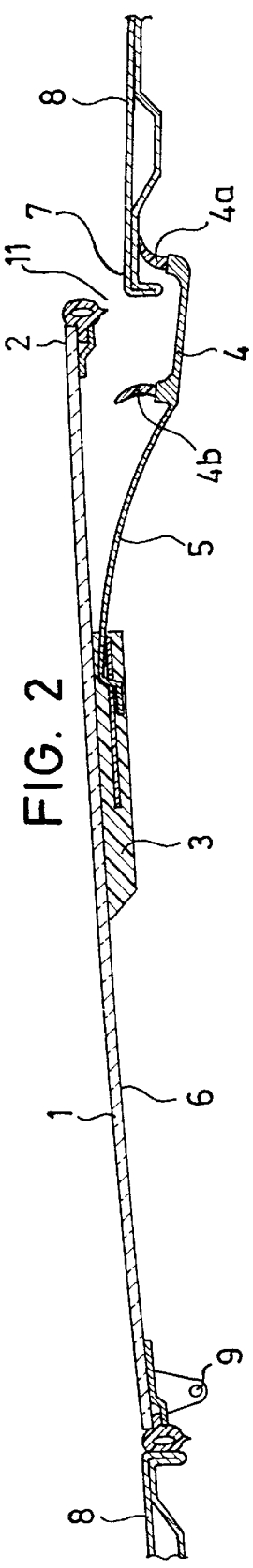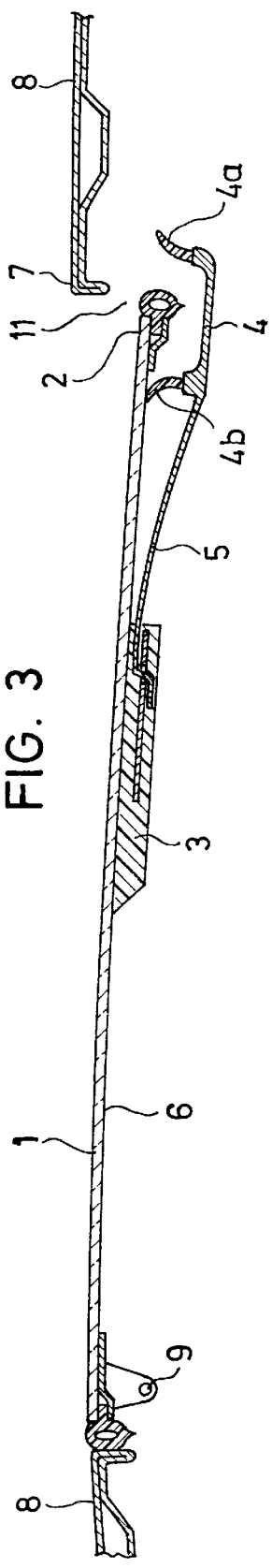

MOTOR VEHICLE SLIDING ROOF

BACKGROUND OF THE INVENTION

1. Field of the Invention

The invention relates to a sliding roof, especially a sliding and lifting roof, for motor vehicles with a cover which selectively closes or at least partially exposes a roof opening formed in a fixed part of the vehicle roof, and with a movable gutter which comes to rest under the rear edges of the cover and roof opening in the closed position of the cover, and is joined by at least one connection arm to parts of the cover or a cover reinforcing part which is located at a distance from the rear edge of the cover, and which is pressed against the bottom of the cover and the fixed vehicle roof part in the closed position of the cover by a corresponding prestress of the connection arms.

2. Description of the Related Art

A sliding roof of the type to which this invention relates is known from German Patent No. 34 44 606. A construction with flexible connection arms and especially of their attachment to the vehicle roof is not described in this publication which, in particular, relates to rigidly made connection arms which are coupled at one end to pivot on the cover and at the other end pivotally support the gutter, springs being provided to preload the stiff connection arms in the direction toward the inner side of the cover. A similar construction with stiff connection arms which are coupled to the cover and which, however, rigidly supports the gutter is known from Publish Japanese Patent Application No. 61-27724, which likewise relates to a sliding vehicle roof.

SUMMARY OF THE INVENTION

The primary object of the present invention is to devise a sliding roof of the initially mentioned type which allows simple mounting of the gutter and which always ensures its reliable operation.

This object is achieved by the connection arms that are made as elastically flexible connection arms which are held by a form-fit connection on the cover or a cover reinforcing part.

Accordingly, the invention calls for direct form-fitted connection of the connection arms themselves, made as elastically flexible connection arms, to the top parts or the cover reinforcing part, thus guaranteeing that the gutter is always pressed tightly against the bottom of the cover and the fixed vehicle roof part or with the sliding roof part raised tightly solely against the bottom of the vehicle roof part by the inherent elasticity of the connection arms in the closed position of the cover. For this purpose, a construction of the connection arms in the manner of a leaf spring made from sheet steel, plastic or another suitable material is especially suitable. Alternatively, the connection arms can also be produced from a composite, for example, plastic with a sheet metal insert or spring wire insert.

The form-fitted coupling of the elastically flexible spring arms to the lateral cover parts or cover reinforcing part yields the advantageous feature of simple mounting on the cover. For example, the connection arms can be easily manually inserted into slots in the inner sheet metal of the cover. In the case in which the cover reinforcing part is formed as a plastic coating or molding on the edge of the cover inside, an attachment of the connection arms to the cover is obtainable which is especially advantageous in terms of production engineering, because it saves additional mounting steps, in the incorporation of the connection arms into the plastic coating, i.e., in injection of these arms during the coating process, for which the arms need only be accurately positioned on the inside of the cover. In any case, additional attachment parts, such as bolts for attachment of the connection arms to the cover, and additional springs and the associated additional mounting costs are eliminated.

Advantageously, the gutter is furthermore made integrally with elastomer material sealing elements provided on its upper edges and is molded to the elastic spring arms to promote ease of manufacture.

In one especially advantageous embodiment, the gutter, the connection arms, and the plastic coating are molded to the cover as a cover reinforcement in a single working process.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 1 schematically shows a longitudinal section of the sliding roof with the cover in the closed position;

FIG. 2 shows a longitudinal section of the sliding roof with the cover raised;

FIG. 3 is a longitudinal section of the sliding roof with the cover in a lowered position;

DETAILED DESCRIPTION OF THE PREFERRED EMBODIMENT

Figure 4:
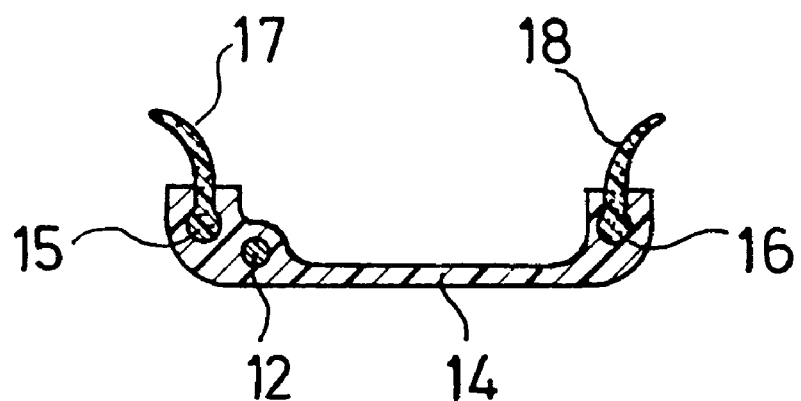
FIG. 4 is an enlarged cross-sectional representation of a gutter.

As FIGS. 1 through 3 show, a cover reinforcing part 3 is attached to the underside of a sliding roof cover 1 at a distance from its rear edge 2. Preferably, the cover reinforcing part 3 is a cover inner sheet or a plastic part which is injection molded onto the underside of the cover 1 or is made as a foamed coating on the inner surface of the cover 1.

A gutter 4 is securely joined to the cover 1 via two laterally spaced connection arms 5, only one of which is shown in FIGS. 1 through 3. The pair of connection arms 5 is located laterally in the rear area of cover 1 and are mounted by being form-fit or embedded in cover reinforcing part 3 at the same time by plastic coating or foamed coating. For example, the connection arm can be easily manually inserted into slot 27 in the inner sheet metal 28 which is incorporated into reinforcing part 3 of the cover 1 when it is formed as a plastic coating or molding on the inside of cover 1. In this manner, an attachment of the connection arms to the cover is obtainable which is especially advantageous in terms of production engineering, because it saves additional mounting steps in that additional attachment parts, such as bolts for attachment of the connection arms to the cover, and the associated additional mounting costs are eliminated.

In the case of making the cover reinforcing part 3 as an injection molded plastic part, the two connection arms 5 are embedded in the plastic material, from which an especially simple mounting process results for gutter 4 and its connection arms 5 on cover 1.

Gutter 4 preferably has a U-shaped cross section and the two connection arms 5 are made so long that gutter 4 comes to rest in the area between rear edge 2 of cover 1 and the opposite edge 7 of the fixed vehicle roof part 8. When the sliding roof cover 1 is closed (FIG. 1), the upper free edges (FIG. 5) of the sides of the gutter which is U-shaped in cross section, that is the edges, formed as sealing lips 25, 26 or provided with seal 17, 18, are pressed under spring prestress against the underside of cover 1 and the underside of the vehicle roof part 8 in the area of their respective edges 2,7. This spring prestress is produced by the connection arms 5 being made elastically flexible and attached with the corresponding prestress to or in reinforcing part 3, with the connection arms 5 running essentially parallel to cover 1 in this state. Connection arms 5 are preferably made as leaf springs, or as plastic parts reinforced by leaf springs, which are formed, for example, integrally as one piece with the gutter 4 which, likewise, is made of a plastic material. To ensure that the seal 17 or 25 fits tightly against front edge 4b on cover 1 over the entire width of the roof opening, the gutter 4, itself, is preferably made with an elastic preliminary arch directed toward the cover.

FIG. 2 shows the raised position of the sliding roof cover 1 in which it is pivoted upward around an axis of rotation 9. In this position, the gutter 4 is supported exclusively by its rear side 4a behind edge 7 on the underside of the fixed vehicle roof part 8. Front side 4b of gutter 4 is moved away from cover 1 as the cover is lifted and the connection arms 5 are deflected away from the cover 1; in this way, the gutter is pressed, on the one hand, with increased force against the fixed vehicle roof part 8, and moreover, allows an advantageous tilted position of gutter 4, by which its front side 4b acts as a raised surge wall to catch water which shoots forward, especially when braking, over the rear part of the fixed vehicle roof 8, and which could otherwise penetrate through roof opening 11 to the interior. To enable the tilted position, connection arms 5 are preferably attached to gutter 4 at the front edge thereof.

FIG. 3 shows the lowered position of sliding roof cover 1 in which gutter 4 is pressed by elastic connection arms 5 against the inner side 6 of the cover 1 only at front side 4b; i.e., rear side 4a of gutter 4 is at a distance below edge 7 of vehicle roof part 8, by which the cover 1 can be moved unhindered to the rear under the vehicle roof part 8.

According to one especially preferred embodiment, the gutter 4, 14, 24, connection arms 5 and cover reinforcing part 3 are molded to cover 1 in a single plastic molding process. On the one hand, this can take place by placing separate connection arms 5 and preformed gutters in an injection mold, and on the other, by forming all parts in a single injection mold.

Figure 5:
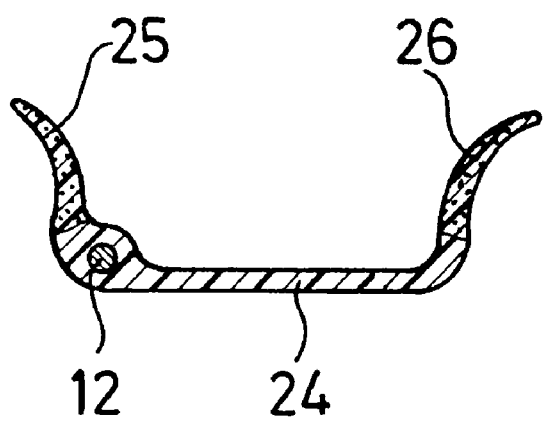
FIG. 5 is a view corresponding to that of FIG. 4, but showing a second gutter embodiment.

As FIGS. 4 and 5 show, spring wire 12, of which connection arms 5 are formed, can be used at the same time as a reinforcement of the gutter formed, in this case, as a injection molded plastic part, the reinforcement running transversely over the entire length of the gutter 14, 24.

When the plastic injection-molded gutter is formed, either seal holders 15, 16 provided on gutter 14 in the area of the vertical side, into which correspondingly shaped seals 17, 18 are inserted (FIG. 4), or the vertical sides of gutter 24 sealing lips 25, 26 of a softer elastomer are molded directly to their upper ends at the same time.

These and further objects, features and advantages of the present invention will become apparent from the following description when taken in connection with the accompanying drawings which, for purposes of illustration only, show several embodiments in accordance with the present invention.

We claim:

1. Sliding roof for a motor vehicle comprising a cover which selectively closes or at least partially exposes a roof opening formed in a fixed roof part of the vehicle and a movable gutter which, in a closed position of the cover, engages under rear edges of the cover and the fixed roof part, the gutter being joined via at least one connection arm to parts of the cover located at a distance from the rear edge of the cover in a manner causing the gutter to be pressed against an underside of the cover and the fixed roof part by a prestressing of said at least one connection arm; wherein the at least one connection arm is made of an elastically flexible construction and held on the cover by a form-fit connection; wherein said at least one connection arm is made of an elastically flexible plastic material; and wherein said form-fit connection comprises the at least one connection arm being held in a slot of a part on an inner surface of the cover.

2. Sliding roof for a motor vehicle comprising a cover which selectively closes or at least partially exposes a roof opening formed in a fixed roof part of the vehicle and a movable gutter which, in a closed position of the cover, engages under rear edges of the cover and the fixed roof part, the gutter being joined via at least one connection arm to parts of the cover located at a distance from the rear edge of the cover in a manner causing the gutter to be pressed against an underside of the cover and the fixed roof part by a prestressing of said at least one connection arm; wherein the at least one connection arm is made of an elastically flexible construction and held on the cover by a form-fit connection; wherein a cover reinforcing part is provided on an inner side of the cover, said at least one connection arm being securely joined therein; and wherein the cover reinforcing part is formed of plastic and an end of portion of said at least one connection arm is embedded therein.

3. Sliding roof as claimed in claim 2, wherein the gutter is molded of plastic onto said at least one connection arm.

4. Sliding roof as claimed in claim 2, wherein said at least one connection arm is made of an elastically flexible steel sheet in the form of a leaf spring.

5. Sliding roof as claimed in claim 2, wherein said at least one connection arm is made of an elastically flexible plastic material in the form of a leaf spring.

* * * * *